United States Patent [19]
Beshears et al.

[11] Patent Number: 5,998,741
[45] Date of Patent: *Dec. 7, 1999

[54] SYSTEM AND METHODS FOR ACCURATELY WEIGHING AND CHARACTERIZING MOVING VEHICLES

[75] Inventors: David L. Beshears; Gary J. Capps, both of Knoxville; John K. Jordan, Oak Ridge; John V. LaForge, Knoxville; Jeffrey D. Muhs, Lenoir City; Robert N. Nodine, Knoxville; Matthew B. Scudiere, Oak Ridge; Cliff P. White, Knoxville, all of Tenn.

[73] Assignee: Lockheed Martin Energy Research Corp., Oak Ridge, Tenn.

[*] Notice: This patent is subject to a terminal disclaimer.

[21] Appl. No.: 09/302,319

[22] Filed: Apr. 29, 1999

Related U.S. Application Data

[63] Continuation of application No. 08/815,107, Mar. 11, 1997.

[51] Int. Cl.[6] ............................ G01G 19/02; G01G 19/22
[52] U.S. Cl. ......................................... 177/133; 177/25.13
[58] Field of Search ................................. 177/25.13, 132, 177/133, 134, 136

[56] References Cited

U.S. PATENT DOCUMENTS

| | | | |
|---|---|---|---|
| 3,835,945 | 9/1974 | Yamanaka et al. | 177/134 |
| 4,049,069 | 9/1977 | Tamamura et al. | 177/134 |
| 4,691,290 | 9/1987 | Griffen | 177/25.13 |
| 5,002,141 | 3/1991 | Loshbough et al. | 177/134 |
| 5,111,897 | 5/1992 | Snyder et al. | 177/132 |
| 5,260,520 | 11/1993 | Muhs et al. | 177/132 |

OTHER PUBLICATIONS

Franklin, G.F. et al., *Feedback Control of Dynamic Systems*, Addison–Wesley Publishing Company, Reading, Mass., pp. 49–58, 540–547 (1986).

Glisson, T.H., *Introduction to System Analysis*, McGraw–Hill Book Company, New York, pp. 59–62, 109–127 (1985).

*Primary Examiner*—Randy W. Gibson
*Attorney, Agent, or Firm*—Jones & Askew, LLP

[57] ABSTRACT

This system and method of operation weighs and characterizes a moving vehicle traveling on a roadway. The moving vehicle travels across a weight transducer and first and second switching devices. The transducer provides a first set of output signals indicative of vehicle tire loading. The switching devices provide second output signals indicative of vehicle speed and characterization. Processor means receive the first and second output signals and characterize the vehicle; calculate the vehicle speed and calculate the vehicle weight by integrating the second output signals and combining with the vehicle speed.

21 Claims, 17 Drawing Sheets

SYSTEM AND METHODS FOR ACCURATELY WEIGHING AND CHARACTERIZING MOVING VEHICLES

This application sis a continuation of prior U.S. application Ser. No. 08/815,107 filed on Mar. 11, 1997.

BACKGROUND OF THE INVENTION

1. Field of the Invention

This invention relates to measurement systems. More particularly, the invention relates to systems and methods for measuring the weight and determining the characteristics of moving vehicles.

2. Description of Prior Art

There are several varieties of weigh-in-motion systems currently available for moving vehicles which use various types of mechanisms for weighing the moving vehicle. The most common of these weighing systems rely on piezoelectric sensors, hydraulic load cells, bending plate strain gauges, linear variable differential transformers, and capacitive mats. Hydraulic load cells and bending plate strain gauges are considered to be the most accurate of these mechanisms.

Dynamic weighing systems to date appear to rely on an "ideal" response of vehicle tires rolling over a linear sensor. Theoretically, all of the information required is available to determine a gross weight and center of balance. An "ideal" response for a very carefully designed level and smooth road bed is not achieved in more than three-fourths of the weighing situations due to vehicle oscillations as the tires roll over the sensor. These oscillations can be in any direction: Vertical, side-to-side, or front-to-back. To overcome these situations, the sensor must be larger than the tire footprint (or not all the tire will be weighed during a peak weight measuring method). If the vehicle happens to be rocking from side-to-side (a situation observed many times) as the vehicle traverses the sensors, then the sum of the left and right power peaks will produce an artificially high result.

Prior art related to weighing moving vehicles is as follows:

U.S. Pat. No. 4,049,069 issued Sep. 20, 1996, discloses apparatus for measuring the weight of a moving vehicle. The apparatus includes a series of platforms with the length of each platform being shorter than the distance between axles; means for converting displacement of the platforms to electrical signals and electronic means for averaging the signals produced by the individual axle loads to produce the weight of the moving vehicle.

U.S. Pat. No. 5,260,520 issued Nov. 9, 1993, and assigned to the same assignee of the present invention, discloses apparatus for weighing a vehicle in motion using a plurality of elongated fiber-optic sensors defined by an optical fiber embedded in a casement of elastomeric material and disposed parallel to each other on the roadway in the path of a moving vehicle. Switch means are used in conjunction with the sensors to provide signals indicative of the speed of the moving vehicle, the number of axles, weight distribution, tire position, and the wheel base of the vehicle. The switch means are formed of optical fibers and the extent of light transmission through the fibers during contact with the tire of the vehicle is indicative of the vehicle weight.

None of the prior art discloses a weigh-in-motion system and method for moving vehicles in which an "ideal" weigh-in response is achieved in spite of vehicle oscillation occurring as sensors are traversed by the vehicle.

SUMMARY OF THE INVENTION

An object of the invention is a system and method of operation for accurately weighing and characterizing moving vehicles which is compatible with a wide variety of weighing transducers.

Another object is a system and method of operation for weighing and characterizing vehicles in motion which provides an "ideal" response despite vehicle oscillations.

Another object is a system and method for accurately weighing moving vehicles by integration of data generated by sensors traversed by a moving vehicle.

These and other objects, features and advantages are achieved in at least one weight transducer having an entrance and an exit and positioned in the path of a moving vehicle. The transducer provides first output signals indicative of the vehicle loading as the vehicle travels across the transducer. Switching means positioned between the entrance and after the exit of the transducer provides second output signals indicative of the vehicle speed and characterization as the vehicle travels across the switching means. A processor receives the first and second output signals and using programmable instructions stored in a memory calculates vehicle speed using the switch spacing and switching times from the second output signals and vehicle weight by integrating the first output signal and combining with the vehicle's speed. Vehicle characterization e.g. wheel spacing, tire length, wheel weight are calculated by the processor from the first and second output signals.

DESCRIPTION OF THE DRAWING

The invention will be further understood from the following detailed description of preferred embodiment taken in conjunction with the appended drawings in which.

DESCRIPTION OF PREFERRED EMBODIMENT

Figure 1:
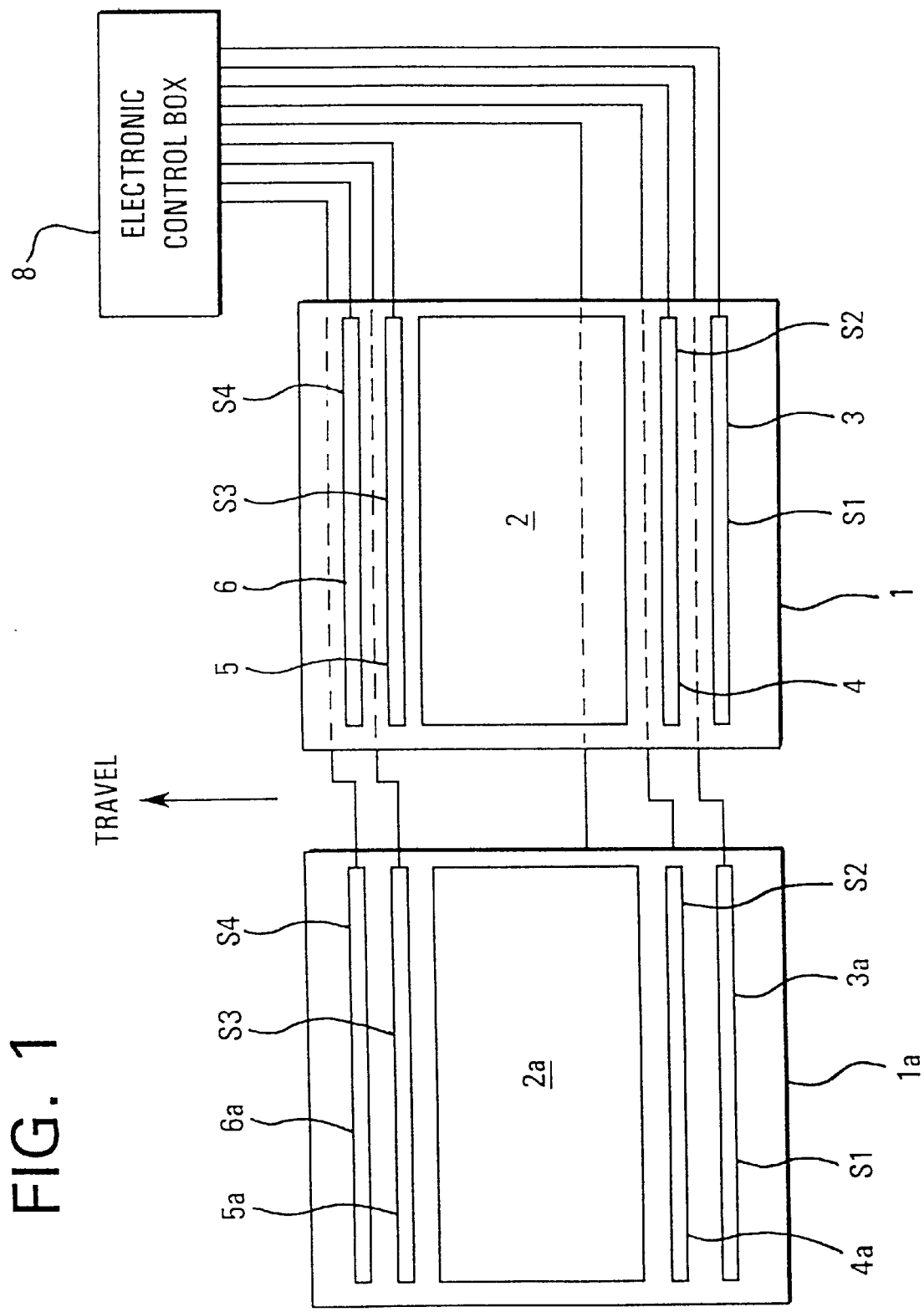
FIG. 1 is a representation of a weighing-in-motion and characterizing system and method for moving vehicles incorporating the principles of the present invention.

In FIG. 1, two similarly constructed weighing units 1 and 1a are placed side-by-side across the lane of traffic perpendicular to the flow over which moving vehicles pass. A single weighing unit could be used in place of the two units if the single unit had sufficient width with respect to the traversing vehicles. Each weighing unit consists of a low profile sensor or transducer 2, 2a which could be a hydraulic load cell, a bending strain gauge, etc., (the transducer must give a uniform response from left-to-right across the width of the transducer. Two contact switches 3, 3a and 4, 4a are placed before the transducers and two contact switches 5, 5a and 6, 6a after the transducers. All contact switches are placed at known locations with respect to the transducer for vehicle speed calculation purposes. An electronic control box 8 receives and analyzes incoming signals from the switches and transducers.

The system accurately determines velocity, number of axles, axle spacing, weight distribution on each axle, and the center of balance of a vehicle traversing the transducers and switches. Each of the switches before and after the transducers, provides on/off signals to the control box for determining the velocity of the vehicle, the number of axles, and the axle positions. The system may be assembled in a portable configuration in which removable ramps can be placed at the front and rear of each unit 1 and 1a. The multiple contact switches in the front and rear of the unit are spaced approximately 2.5 inches apart on center lines which provides assurance that vehicles with unusual tread patterns will not miss both switches. The switches provide redundancy when possible to give a more accurate velocity measurement and the switch output is provided to the box 8 which contains an algorithm for accurately determining the weight of the vehicle. With the switches 3, 4 and 5, 6 placed near the transducers, the instantaneous velocity of the vehicle can be measured as the vehicle crosses the transducers 2, 2a thereby eliminating errors affecting the weight of the vehicle from erroneous vehicle speed measurements.

Figure 2:
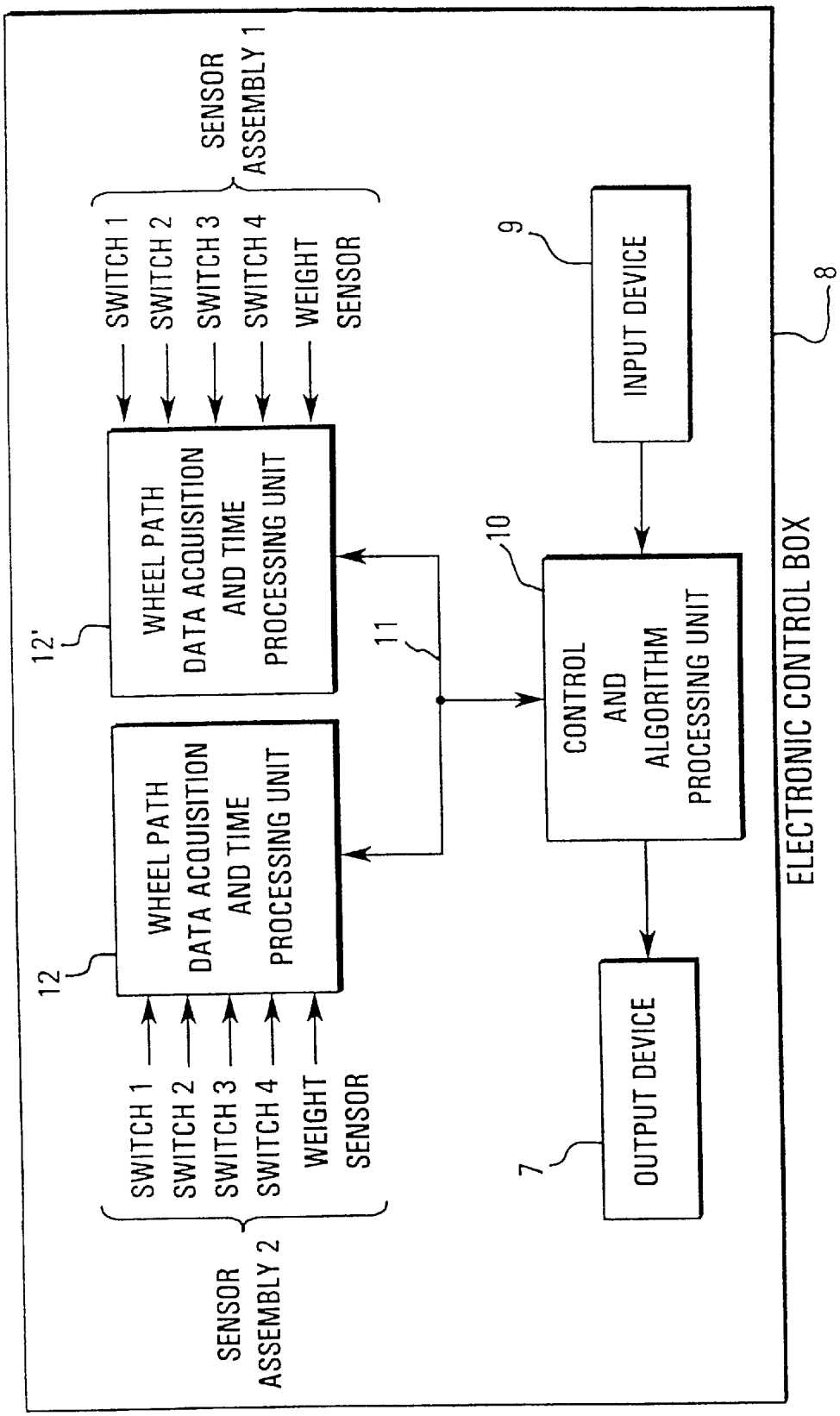
FIG. 2 is a block diagram of an electronic control box included in FIG. 1.

Each of the switches 3, 4, 5 and 6 as well as the transducers are coupled through separate electrical cables to the electronic control box 8 shown in FIG. 2. Separate wheel path data acquisition and timing hardware 12, 12' is provided for each sensor or transducer assembly, but other data acquisition and timing systems may be employed in the invention. A single control and algorithm processor 10 collects the information from each wheel processor 12, 12' through the bidirectional path 11 and calculates axle weights, total vehicle weight, vehicle speed and center of balance, as will be described hereinafter. An output device 16 provides a printed record of the calculated parameters and an input device 9 is used to signal the beginning and end or each individual vehicle run.

Figure 2A:
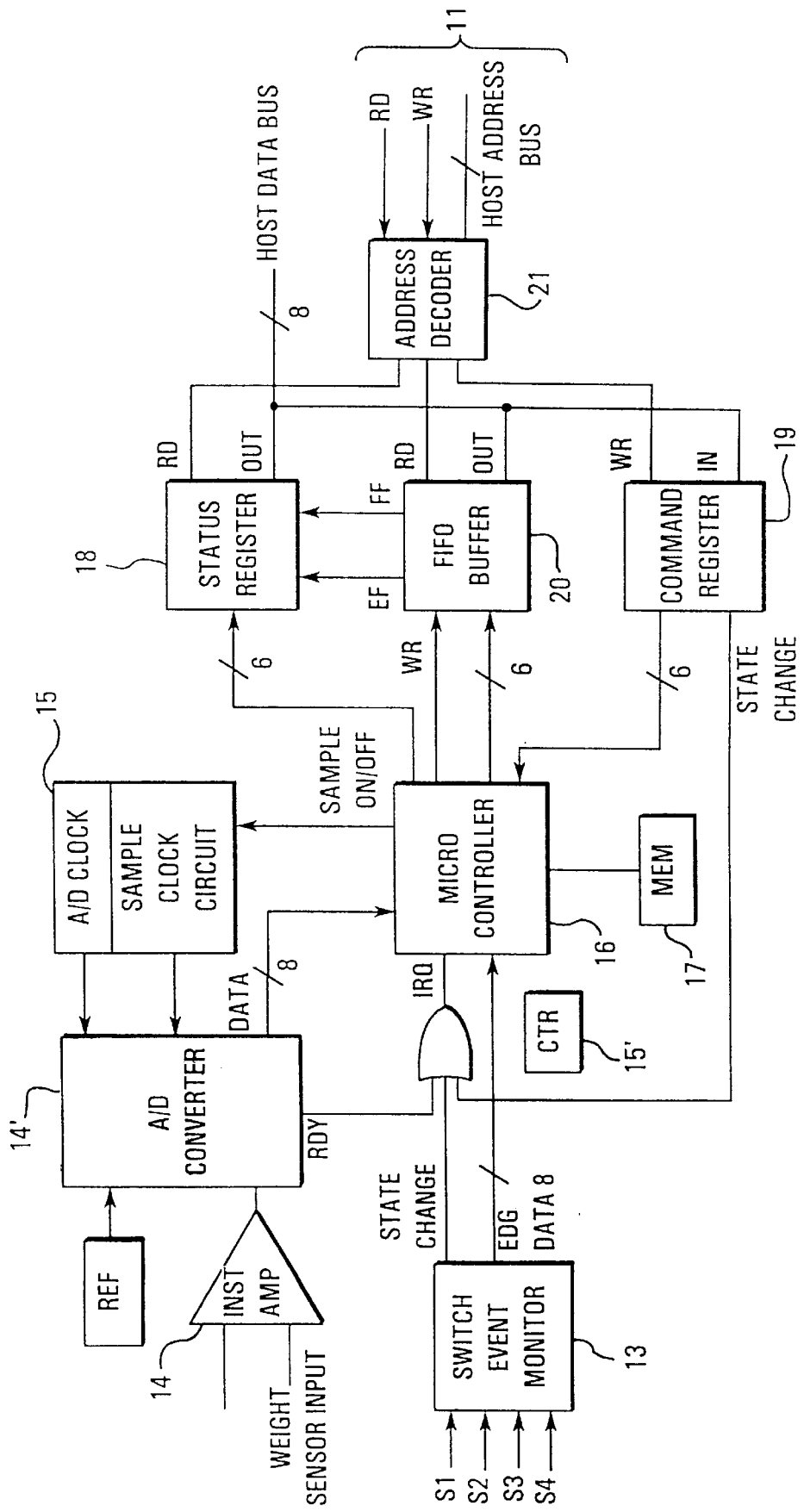
FIG. 2A is a circuit diagram of a wheel path data acquisition and time processing unit included in the electronic control box of FIG. 2.

Turning to FIG. 2A, she main elements of the processors 12 and 12' are switch event (mount and dismount monitoring) circuits 13, a weight sensor monitoring circuit 14 and A/D converter 14', sample clock circuit 15 and counter 15' interact to form an axle timer; a pad or transducer timer and a watch dog timer (all not shown). A processor 16 and memory 17 are coupled to a command register 18, a status register 19, a First-In-First-Out (FIFO) buffer 20 and to the monitoring circuits 13, 14 for data acquisition/tagging purposes. The wheel path, data acquisition and processing units are coupled to the host 10 through an address decoder 21.

Returning to FIG. 2, the processor 10 using program instruction stored in a memory (not shown) can perform the following functions: Enable/disable/reset the processors; read the status register and FIFO buffer. Once enabled, the processors 12 and 12' operate independently of the processor 10 and monitor each wheel that passes over the sensor assembly via the switches 1 . . . 4. Vehicle wheels are timed and sensed until the processor 10 disables the processors 12 and 12'. Since the FIFO buffers and the processors 12 and 12' have finite length, the processor 10 must actively remove data from them when the processors 12 and 12' are enabled. After the processor 10 disables the processors 12 and 12', the data is analyzed and the vehicle parameters calculated. The data in the FIFO's is stored in chronological order and tagged for identification as switch events S1, S2, S3, S4 or weight data events, as will be described in further detail hereinafter.

The total weight of the vehicle can be determined by integrating the transducer or sensor output over time as the tires roll over the sensors followed by multiplying the integration total by the tire speed to convert the result into weight. Tire loading has some distribution $T(x)$ where x is the direction of travel. The load sensor has some response $W(x)$. As the tires roll over the load sensors, the resultant waveform is the convolution $T(x)*(W)(x)$. Since convolution is a linear operator, the integral of the resultant waveform is simply the product of the two individual waveforms which make it up. With the transducer sensitivity being fixed with time, its integral is also fixed with time and can be included in a calibration constant.

The integrated waveform is proportional to tire weight and is independent of the tire footprint. In prior art, peak detection methods, the entire tire must be on the transducer pad at the instance of the peak measurement or adjustments must be made for the tire footprint length which is difficult to determine accurately. By integration, as in the present invention, the can be much smaller, the same size, or much bigger than the active sensor area. If the tread pattern has large gaps, then the sensor must be large enough to provide a reasonable average over the tread pattern to minimize error. The use of two contact switches preceding and two contact switches following the weight sensor or transducer provide accurate and reliable information as to the vehicle speed and contact times with the sensor. The contact switches are strategically placed to ensure that any gaps in the tire tread will not cause both switches on either side of the system to be missed. For tires that do not have large gaps (the normal situation), all four switches are activated. The switch outputs produce eight different useful timings for speed determination of each tire which can be averaged for better accuracy.

The clock circuit 15 (See FIG. 2A) contains two clocks for use in the system. The first clock is a high speed clock used to determine tire speeds, and a second slower clock used to determine time between tires. The two clocks are used in conjunction with 8-bit counters 15' (See FIG. 2A). However, in other applications, a single 16-bit counter works just as effectively. Knowing the tire speeds and the time between tires, the axle spacing is easily calculated. The times the contact switches are activated and the times deactivated are recorded which allows the four speeds to be averaged for even greater accuracy and facilitates the calculation of the tire footprint length.

The processor 10 collects the on and off times for each of the switches and 2,000 to 10,000 data points that make up the waveform response of each tire rolling over the transducers. After a tire leaves the sensors, the waveform is integrated and the tire speed, the tire footprint length, the distance from the first axle are calculated. After the last axle leaves the sensors, the overall vehicle weight and center of balance are determined by conventional methods. Since this is a highly redundant system with four switches per sensor, there are a total of four different ways to determine the speed for each tire if all four switches are activated. Statistics of these variations are calculated and overall system uncertainties are calculated and displayed as an internal consistency check, when required.

Information collected from the transducers may or may not be complete due to gaps in tread patterns not tripping all switches. Therefore, the actual calculations can contain a significant amount of bookkeeping and consistency checking to verify that all information is proper. For example, the consistency check determines if the switches occur in order; whether every on switch is followed by an off switch time; whether there are enough switch timings to accurately determine speed; whether the velocities are consistent with each other; and does the left side agree with the right side. If there is enough information then the run is considered "good"p0 and the resultant information displayed. If not, the run is flagged "bad" and the operator is asked to repeat the operation. "Bad" runs can occur if the switches are accidently activated by something other than the tire being weighed (for example, stepped on or hit) or if the tread pattern has large gaps which is a situation that does not occur except for extremely "aggressive" tread patterns.

The operation of the system is divided into two phases. One phase is directed to data acquisition using the processors 12 and 12' which determines when to digitize data from the weight sensors and keeps track of the times the switches were activated and deactivated. The information acquired is shifted into the FIFO buffer 20 (See FIG. 2A) for use by the processor 10. The second or data processing phase uses stored programs in a memory to acquire the data from the processors 12 and 12'; verify accuracy, and process the raw data into useful results such as tire weight, footprint length, vehicle weight, overall axle spacing, and center of balance. The processor 10 interfaces with an operator via a hand-held terminal to accept commands and displays results. In addition, when appropriate, a video monitor can be connected and a full graphics display of results may be presented. For archival purposes, vehicle results are printed on a separate sheet of paper which can then be attached to the particular vehicle and/or stored on disk.

Figure 3A:
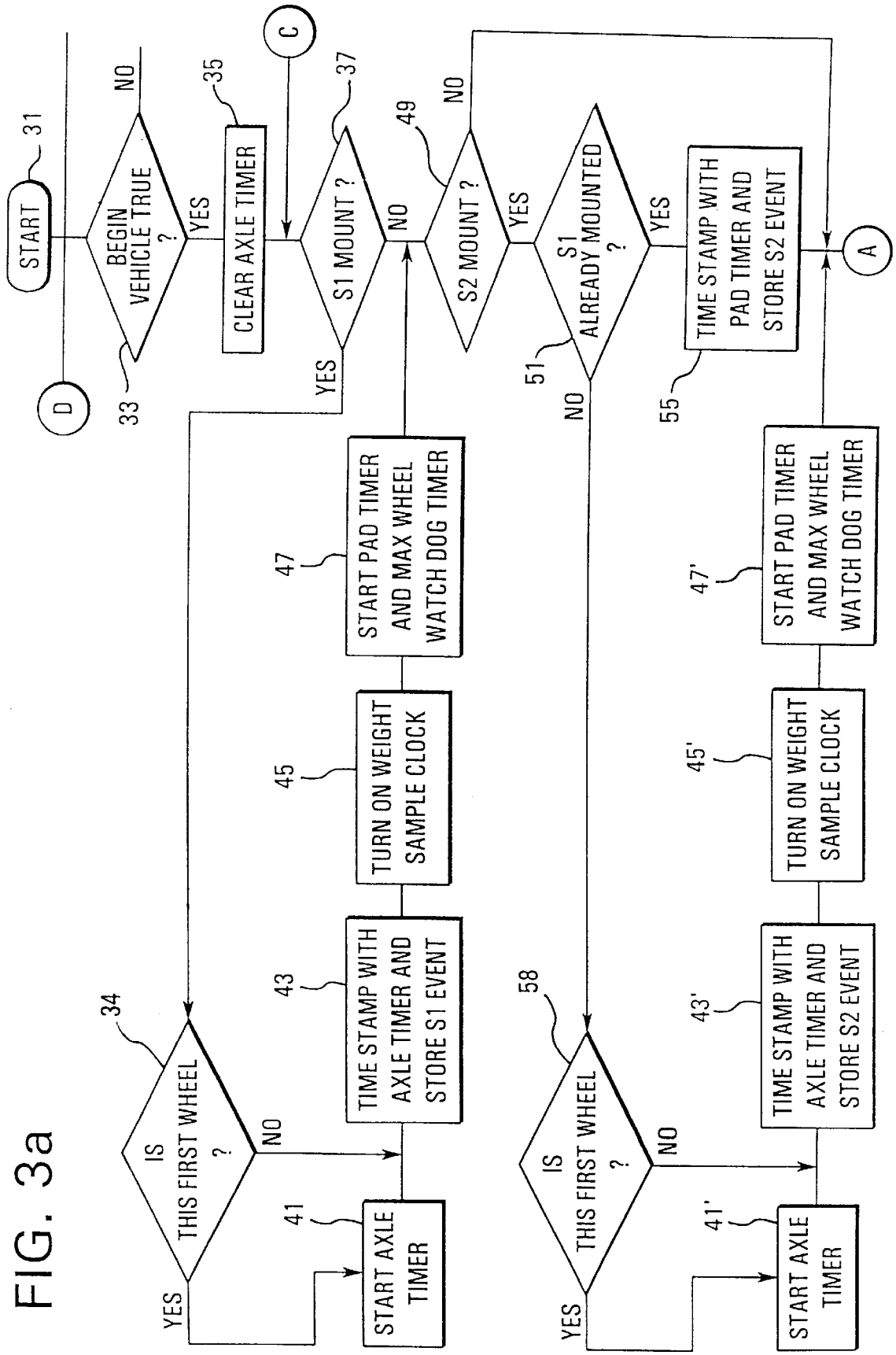
FIGS. 3A, 3B and 3C are flow diagrams for generating data for weighing and characterizing a moving vehicle using the processing unit of FIG. 2A.
Figure 3B:
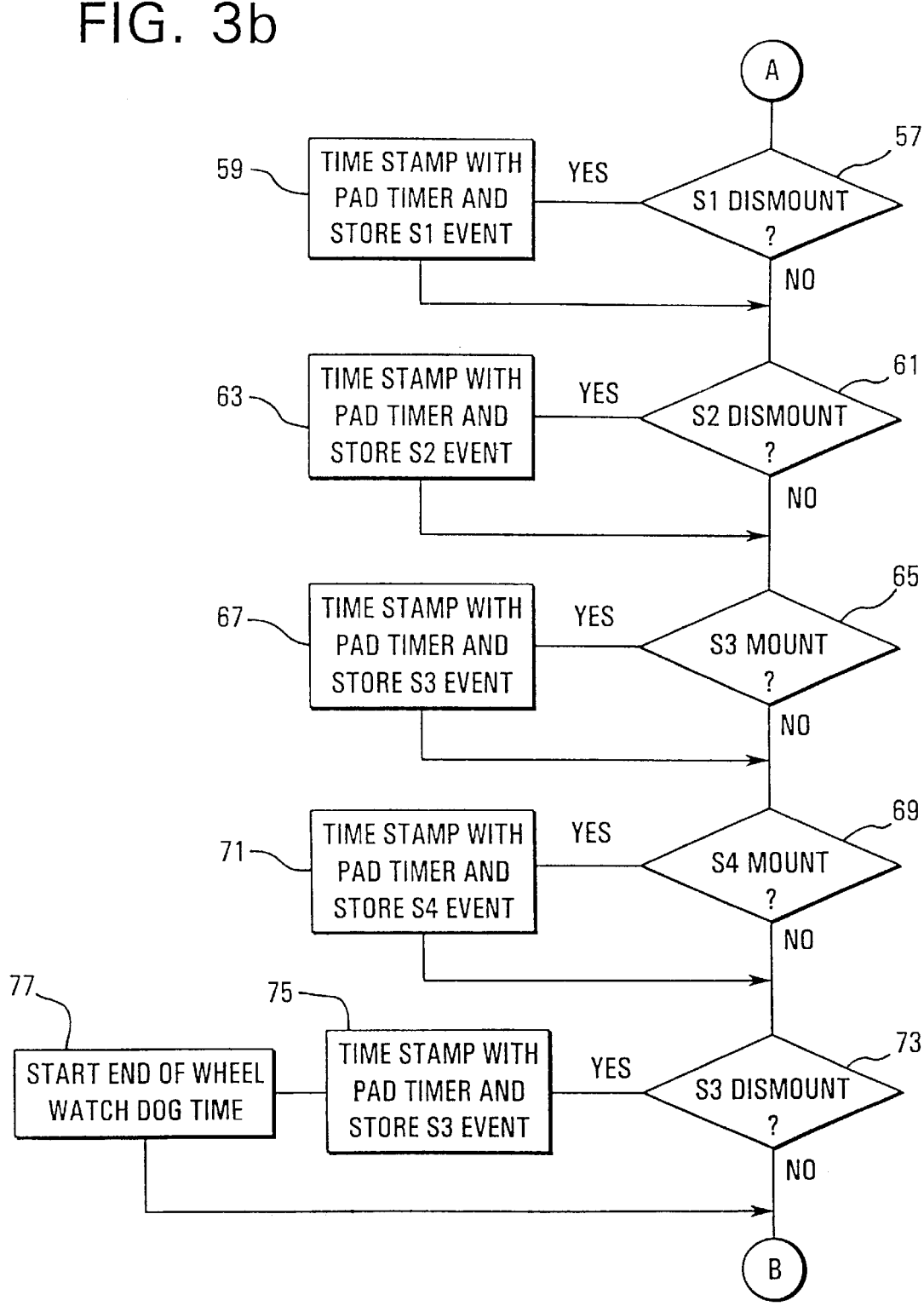
Figure 3C:
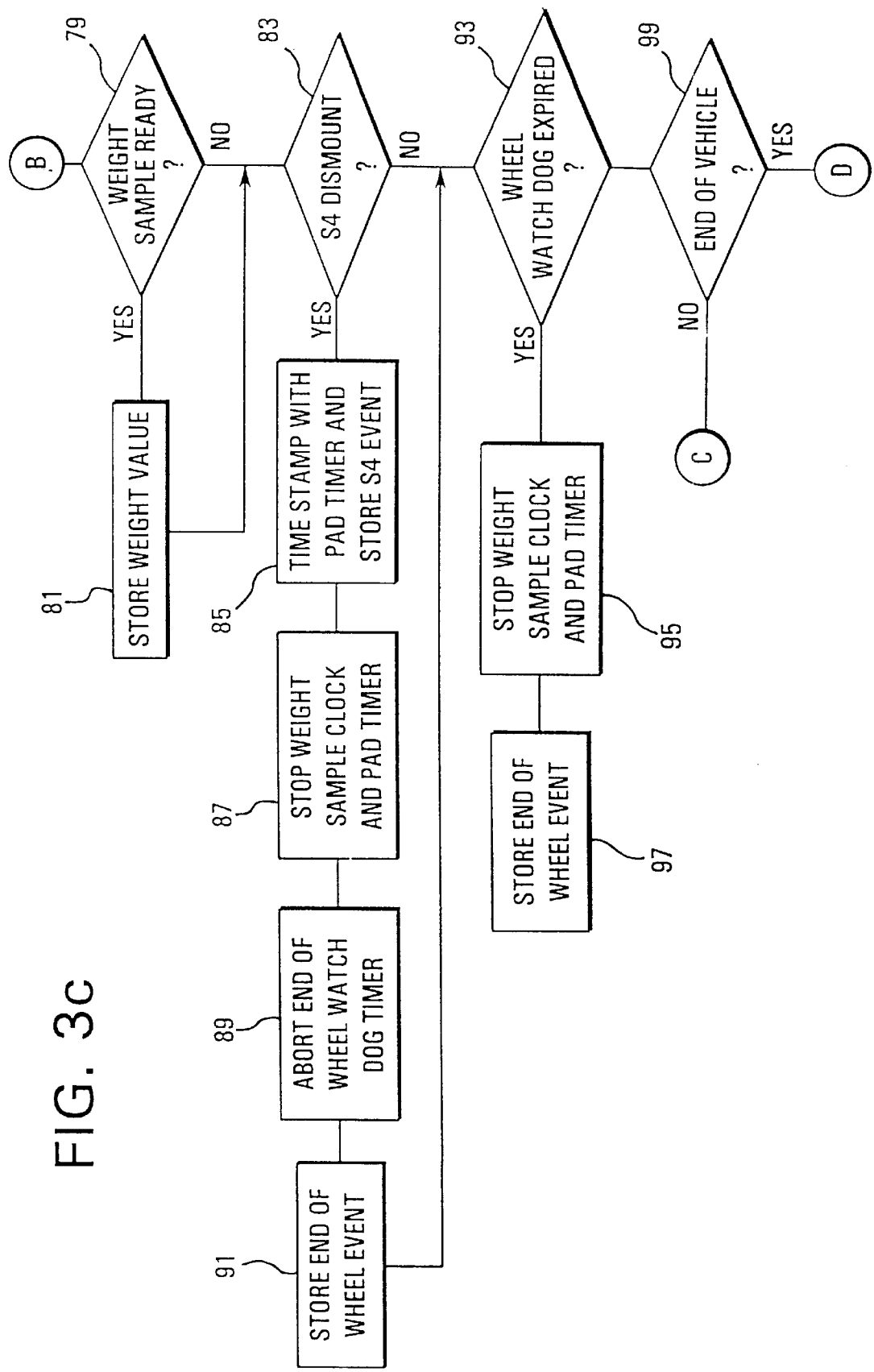

Turning now to FIGS. 3A, 3B and 3C, the operation of the first phase, i.e., data acquisition using the processor 12, 12', will now be described in conjunction with FIG. 2A.

In FIG. 3A, the data acquisition process is entered in a start step 31 which initiates a step 33 for determining whether a vehicle is traversing the transducers 2, 2A. A "no" condition returns the process to the start step. A "yes" condition initiates a step 35 which clears an axle timer in the clock circuit 15. A step 37 is performed to determine whether switch S1 has been mounted. A "yes" condition initiates a test 39 to determine whether the first wheel has crossed the switch S1. A "yes" condition initiates a step 41 to start the axle timer. A "no" condition initiates a step 43 which time stamps the event and stores the event as S1 in memory 17. Step 45 is entered to turn on a weight sample clock in the clock circuit 15. Afterwards a step 47 is entered to start a transducer pad timer and maximum wheel watchdog timer in the clock circuit 15.

The process continues in a step 49 which determines whether switch S2 has been mounted. A "no" condition jumps the process to an exit point at node A. A "yes" condition initiates a step 51 to determine whether switch S1 has already been mounted. A "no" condition initiates a test 53 which determines if this is the first wheel. A "yes" condition initiates a start axle timer stem 41'. A "no" condition initiates time stamps, weight clocks, and pad timer events 43', 45' and 47' previously described.

Returning to step 51, a "yes" condition initiates a step 55 which time stamps the event with the pad timer and stores the output in the memory 17 as an S2 switch event. The process exits node A and continues in a step 57 which determines if switch S1 has been dismounted. A "yes" condition initiates a time stamp 59 using the pad timer and stores the dismount as a switch S event. A "no" condition initiates a test 61 for a switch S2 dismount. A "yes" condition initiates a time stamp using the pad timer and stores the results as an S2 event in an operation 63. A "no" condition for step 61 initiates a test 65 to determine whether switch S3 has been mounted. A "yes" condition initiates an operation 67 which generates a time stamp using the pad timer and stores the result as a switch S3 event. A "no" condition initiates a test 69 to determine whether switch S4 has been mounted. A "yes" condition initiates an operation 71 which generates a time stamp using the pad timer and stares the result as a switch S4 event. A "no" condition initiates a test 73 to determine if switch S3 has been dismounted. A "yes" condition initiates an operation 75 which generates a time stamp using the pad timer and stores the result as a switch S3 event. The step 75 is followed by a step 77 to start an end of wheel watch dog timer which transfers the process to an exit node B. A "no" condition for step 73 transfers the process to the node B which initiates a step 79 to determine if a weight sample is available from the weight monitoring circuit 14. A "yes" condition initiates an operation 81 which stores the weight value in the memory 17 and returns the process to a step 83. Likewise, a "no" condition from the test 79 initiates the step 83 which determines whether switch S4 has been dismounted. A "yes" condition initiates a time stamp using the pad timer and the result is stored as switch S4 event in an operation 85. The weight sample clock and pad timer are stopped in an operation 87. The end of the wheel watch dog timer is aborted in an operation 89 and the end of the wheel event is recorded in an operation 91, after which the process transfers to a test 93 in which the wheel watch dog timer expiration is tested. Likewise, a "no" condition for the step 83 transfers the process to the step 93. A "yes" condition for step 93 stops the weight sample clock and pad timer in an operation 95 and stores the end of the wheel event in an operation 97, after which the process transfers to a step 99. Likewise, a "no" condition for step 93 transfers the process to step 99 which indicates the end of the vehicle. A "yes" condition returns the process to the test 33 to re-execute the process and a "no" condition returns the process to the step 37 to test for the S1 wheel mount of the transducer.

Summarizing the data acquisition/tagging process, two timers, the axle timer and pad timer, are used for wheel data acquisition. The axle timer runs at a slower rate than she pad timer and keeps track of the time between axles. The pad timer measures the time between individual switch events which subsequently enables the calculation of tire velocity. The beginning of each wheel is identified by the S1 switch mount event. In cases where S1 switch fails to function, the S2 mount marks the beginning of the wheel. The first of the S1 or S2 to be mounted at the beginning of each wheel is a time stamp using the axle timer. At the beginning of each vehicle the axle timer is cleared and the first switch to mount by the first wheel will have the time stamp of (t0). The first switch mount in each successive wheel is time tagged with the increasing axle time value. All other switch events are time stamped with the pad timer and the first switch mounted in each wheel is always the (t0) reference for the pad timer. Any time a weight sample clock is turned on, the wheel watchdog timer is started. The watchdog timer terminates data acquisition if the situation arises where neither S3 or S4 operate. Under normal conditions the dismount of the S4 switch signals the end of the wheel and a special data signal is stored in the FIFO to clearly mark the end of the wheel. To safeguard against situations where the S4 switch fails to operate, the dismount event of the S3 switch starts an end of wheel watchdog timer based on the current wheel pad mount time. This allows weight data acquisition to continue until just after the position where the S4 dismount would normally stop acquisition. This wheel acquisition can be achieved by simply starting acquisition on the first switch mount S1 or S2 and stopping it on the first dismount of S3 or S4. The accuracy of the system is significantly improved by using all of the switch timings for wheel velocity calculation and measuring the weight for the entire contact with the pad.

Figure 4:
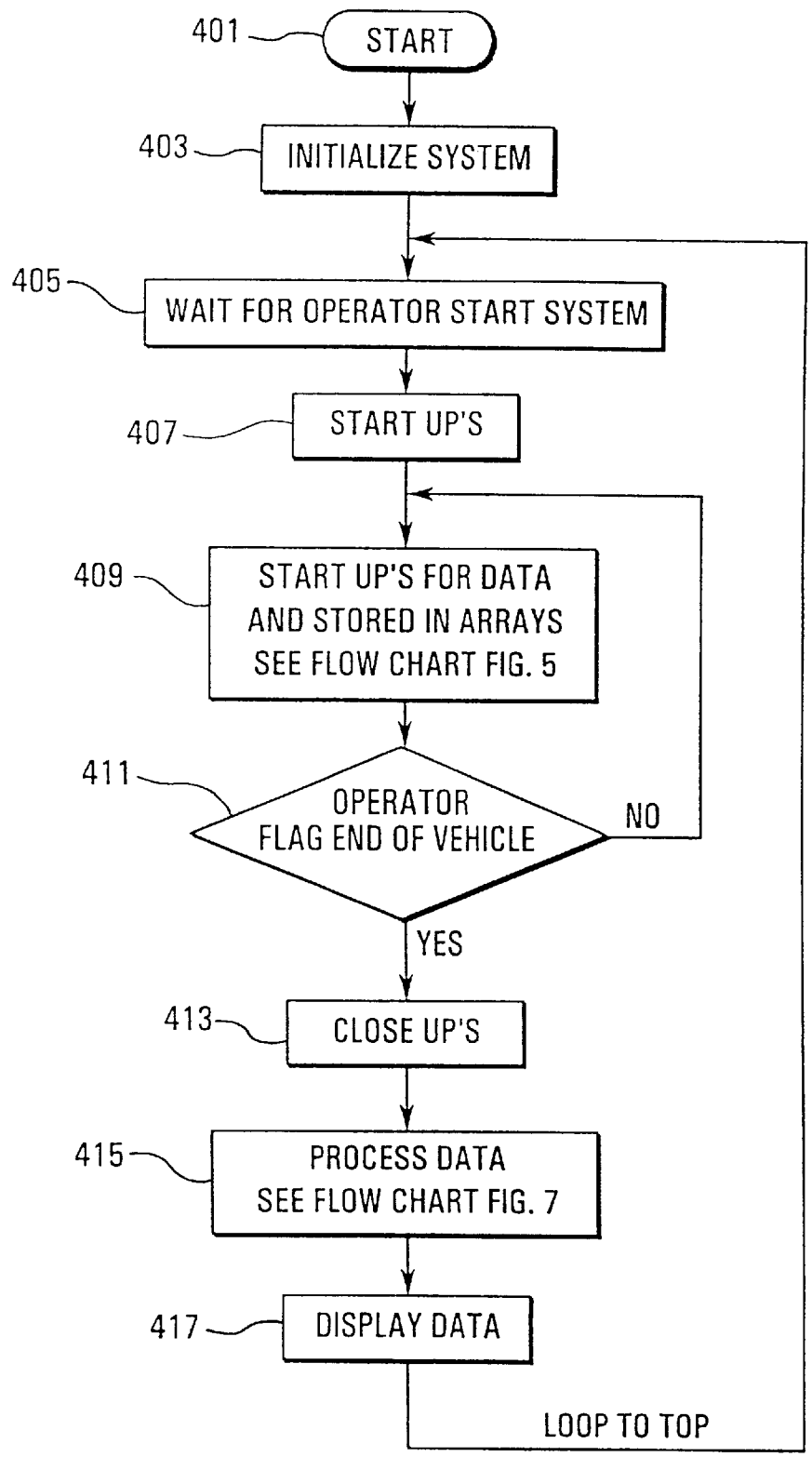
FIG. 4 is a flow diagram executed in the electronic control box of FIG. 2 for controlling the weighing and characterizing of moving vehicles.

Turning to FIG. 4, the data processing phase of the system operation will now be described in conjunction with FIGS. 2 and 2A. The phase is entered in a start step 401 which initializes the data acquisition and data processing phases. An operator start signal for the moving vehicle to be weighed and characterized is provided to the system in an operation 405 which initiates the wheel processors 12 and 12' and the control processor 10 in an operation 407. Data output from the wheel processors is scanned and stored in arrays contained in the processor 10 in an operation 409.

Figure 5:
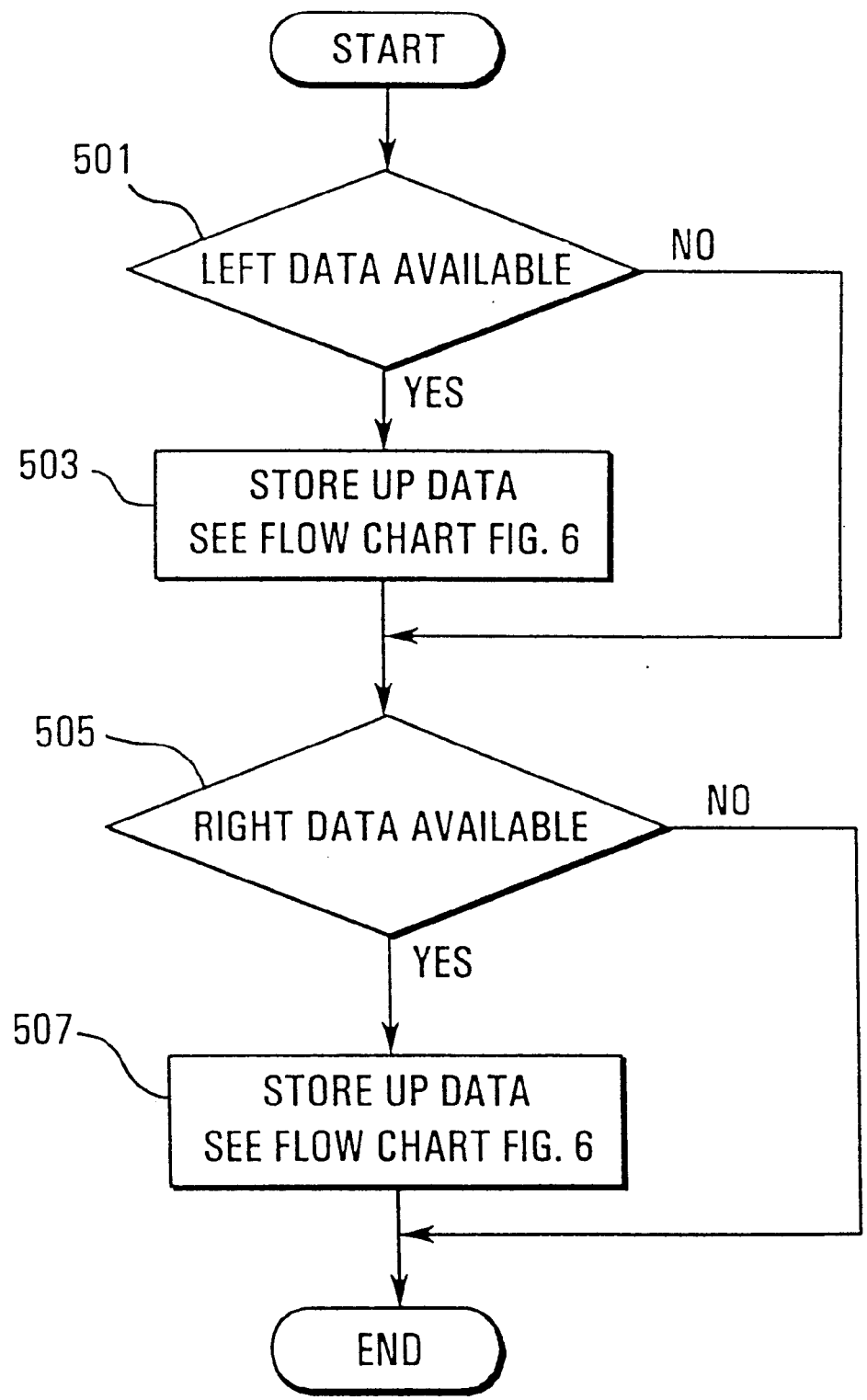
FIG. 5 is a flow diagram or initiating processors in the electronic control box of FIG. 2.

The details of operation 409 are shown in FIG. 5 in which a test 501 is performed to determine whether data is available from the left transducer 2a. A "yes" condition initiates an operation 503 to store the left side data in processor 10. A "no" condition initiates a test 505 to determine whether data is available from the right transducer 2. A "yes" condition initiates a step 507 to store the right side data in the processor 10. A "no" condition initiates an end or operation.

Figure 6:
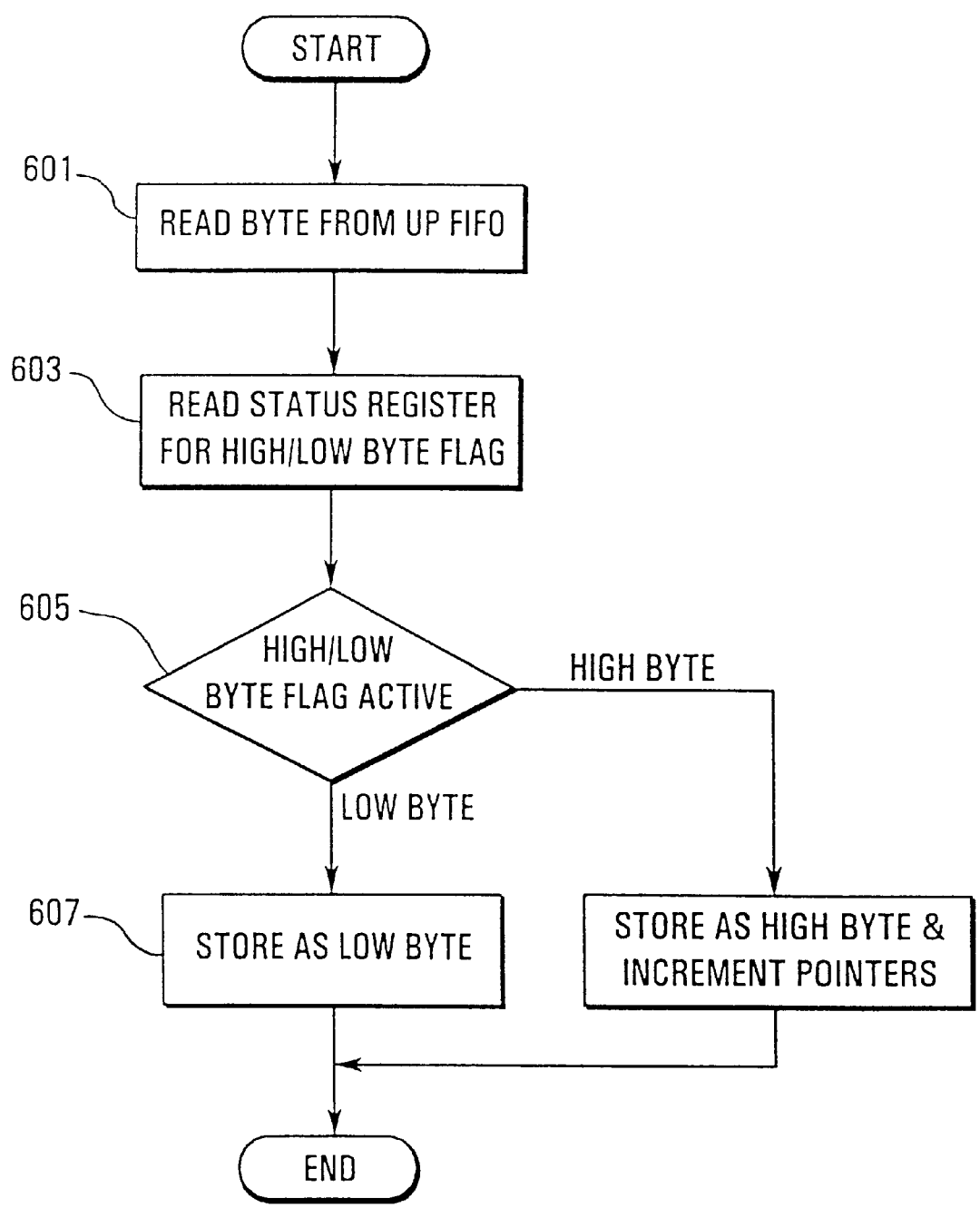
FIG. 6 is a flow diagram for storing data in a control and algorithm processing unit of FIG. 2.

The storing of data in the processor 10 is shown in more detail in FIG. 6. A step 601 is performed to read a byte of data from the FIFO output buffer of the processors 12 or 12', as the case may be. A step 603 is performed to read the status register 18 for a high or low byte flag indicative of the data read in the FIFO 20. A test 605 is performed to detect whether a high or low byte flag has been detected. A low byte flag is stored as a low byte in the processor 10 in an operation 607. A high byte is stored in the processor 10 and pointers are incremented in the memory of processor 10 after which the process ends.

Returning to FIG. 4, after the data has been stored in the processor 10 arrays, a test 411 is performed to determine whether an end of vehicle flag has occurred. A "no" condition returns the process to the step 409. A "yes" condition initiates an operation 413 to turn off the processors 12 and 12" and initiate the data processing phase in a step 415. After processing of the data, a step 417 is performed to display the calculated vehicle weight, etc. The process returns to the operation 405 after the data is displayed in step 417.

Figure 7:
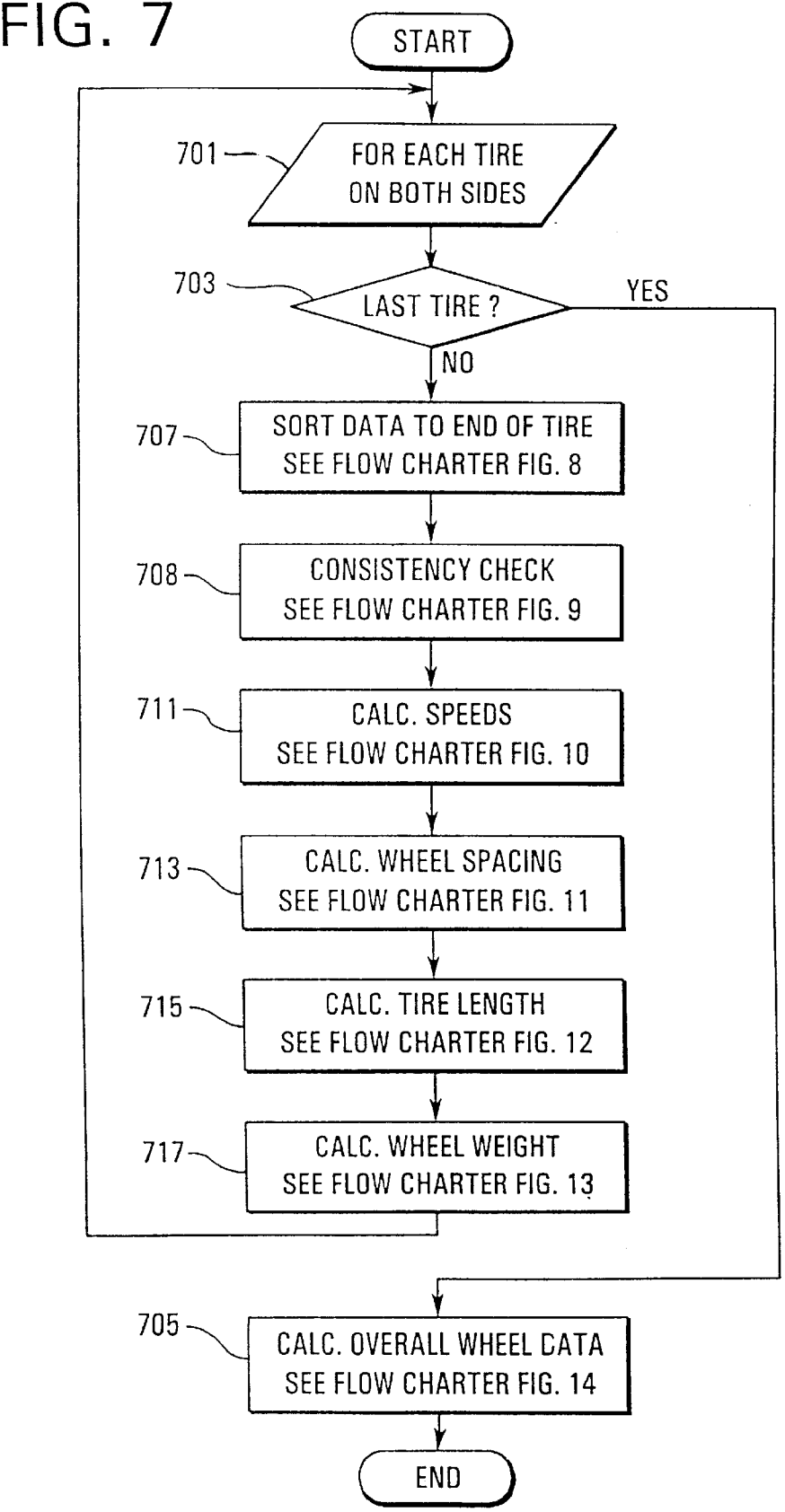
FIG. 7 is a flow diagram for processing moving vehicle data generated by the processor of FIG. 2A in the processor of FIG. 6.

The details for processing the collected and tagged data from FIGS. 3A, B and C are described in FIG. 7.

In FIG. 7 data is processed for each tire on both sides of the vehicle in a step 701. A test 703 is determined to detect the last tire. A "yes" condition initiates an operation 705 which calculates the overall vehicle data including vehicle speed, wheel spacing, tire length, wheel weight, and perform a consistency check to determine whether the data collected is consistent with the measurement process. The step 705 will be further described in FIG. 14. A "no" condition for step 703 initiates a step 707 which sorts data for each tire and the sorting process will be described in conjunction with FIG. 8. Upon completion of step 707, a consistency check is performed in a step 709 which will be further described with FIG. 9. Afterwards, the vehicle speed is calculated in a step 711 which will be further described with FIG. 10. Following the speed calculation, the vehicle wheel spacing is calculated in a step 713 which will be further described with FIG. 11. The process continues by calculating the tire length in a step 715 which will be further described with FIG. 12. The process continues by calculating wheel weight in a step 717 which will be farther described with FIG. 13, after which the process returns to step 701 which begins he data processing phase.

Figure 8:
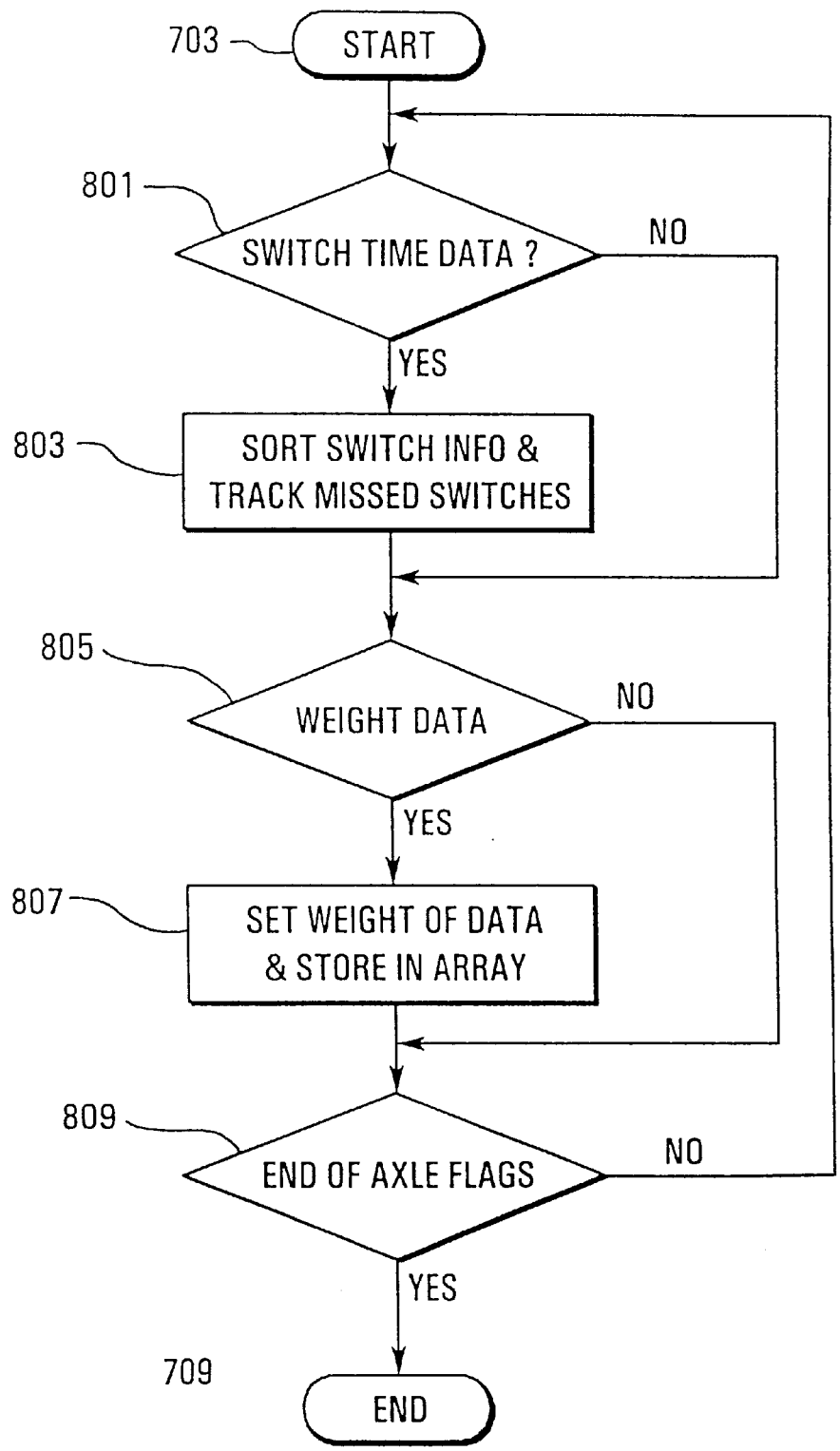
FIG. 8 is a flow diagram for sorting data in the process of FIG. 7.

Turning to FIG. 8, data is sorted in a step 801 to sort the switch time data for the individual wheels generated by the processors 12 and 12'. A "yes" condition initiates a step 803 to sort the switch data and track missed switches, after which the process transfers to a step 805 for collecting the weight data generated by the weight monitoring circuits 13. Likewise, a "no" condition for step 801 transfers the process to the step 805. A "yes" condition for the step 805 initiates a step 807 which establishes a scale for the weight data and stores the data in an array contained in the processor 10, after which the process transfers to a step 809. A "no" condition For the step 805 transfers the process to the step 809. An end of axle flag is determined in step 809 which returns the process to the step 801 if a "no" condition exists and a "yes" condition ends the data sorting process.

Figure 9:
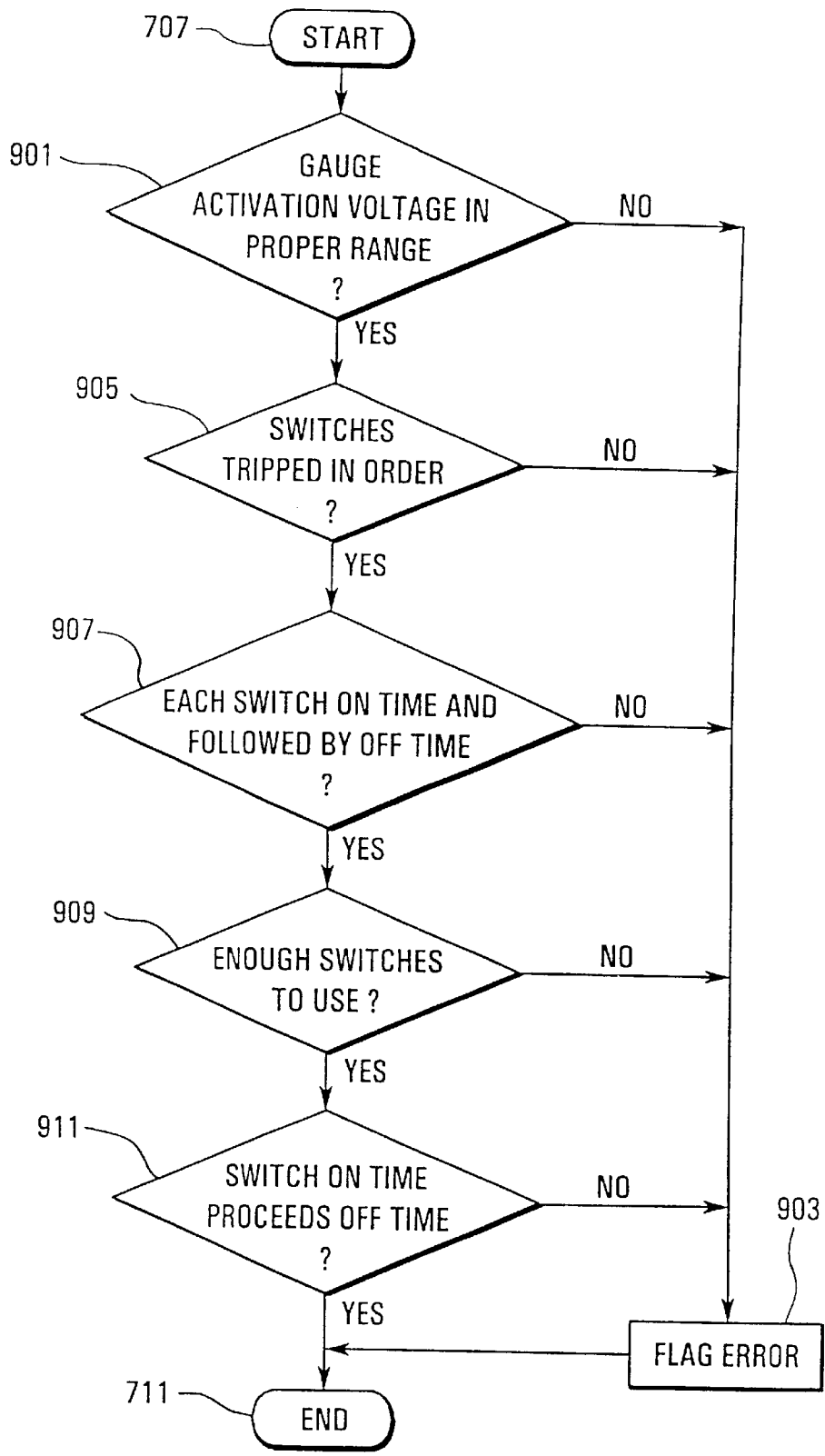
FIG. 9 is a flow diagram for a consistency check contained in the flow diagram of FIG. 7.

Before calculating the vehicle speed, wheel spacing, tire length and wheel weight, a consistency check is performed and will be described in conjunction with FIG. 9. Turning to FIG. 9, a test 901 is performed to determine if the switch voltages provided by S1 . . . S4 are in the proper range for calculating the vehicle characteristics. A "no" condition exits the test to an error indicator 903. A "yes" condition initiates a step 905 to determine if the switches S1 . . . S4 are tripped in proper order for calculating the vehicle characteristics. A "no" condition exits the process to the error state 903. A "yes" condition initiates a test 907 to determine if each switch "on" time is followed by a switch "off" time. A "no" condition exits the process to the error state 903. A "yes" condition initiates a test 909 to determine if sufficient switches S1 . . . S4 have been actuated to calculate the vehicle characteristics. A "no" condition exits the process to the error state 903 while a "yes" condition initiates a test 911 to determine if each switch "on" time precedes a switch "off" time. Again, a "no" condition exits the process to the error state 903 while a "yes" condition ends the process and returns the process to a step 711 ( See FIG. 7) for calculating the vehicle speed to be described with FIG. 10.

Figure 10:
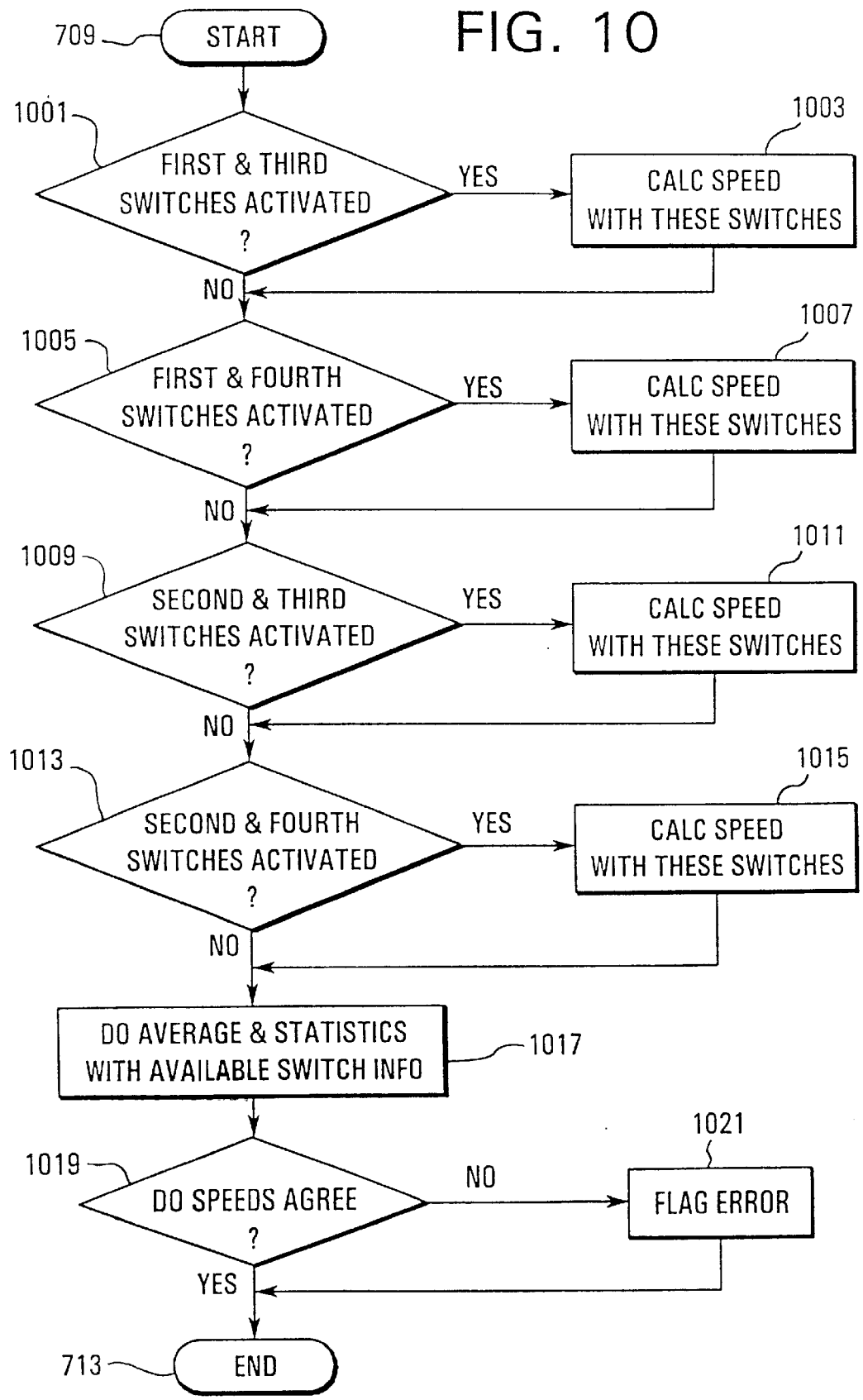
FIG. 10 is a flow diagram for calculating the vehicle speed in the flow diagram of FIG. 7.

Turning to FIG. 10, fine calculation of the vehicle speed begins in a step 1001 to determine whether switches S1 and S3 have been actuated. A "yes" condition initiates an operation 1003 to calculate the vehicle speed using the time interval and physical distance between switches S1 and S3, after which the process transfers to a step 1005. A "no" condition for step the 1001 transfers the process to stem 1005 which determines whether switches S1 and S4 have been activated. A "yes" condition initiates an operation 1007 which calculates the vehicle speed using the time interval and distance between switches S1 and S4 after which the process transfers to a step 1009. Likewise, a "no" condition for step 1005 transfers the process to the step 1009 in which the activation of the switches S2 and S3 is determined. A "yes" condition calculates the vehicle speed using the time interval and distance between the switches in an operation 1011, after which the process transfers to a step 1013. Likewise, a "no" condition for the test 1009 transfers the process to the step 1013 in which the activation of the S2 and S4 switches is determined. A "yes" condition initiates an operation 1015 to calculate the vehicle speed using the time interval and distance between the S2 and S4 after which the process transfers to an operation 1017. Likewise, a "no" condition for the test 1013 transfers the process to the operation 1017 in which the statistics for the vehicle speeds for the different switches S1 . . . S4 are averaged; after which the process transfers to a step 1019 in which the individual speeds for the different switches are checked to determine agreement. A "no" condition initiates an operation 1021 to indicate an error condition. A "yes" condition ends the speed calculating process and returns the process to step 713 (See FIG. 7) for calculating wheel spacing to be described with FIG. 11.

Figure 11:
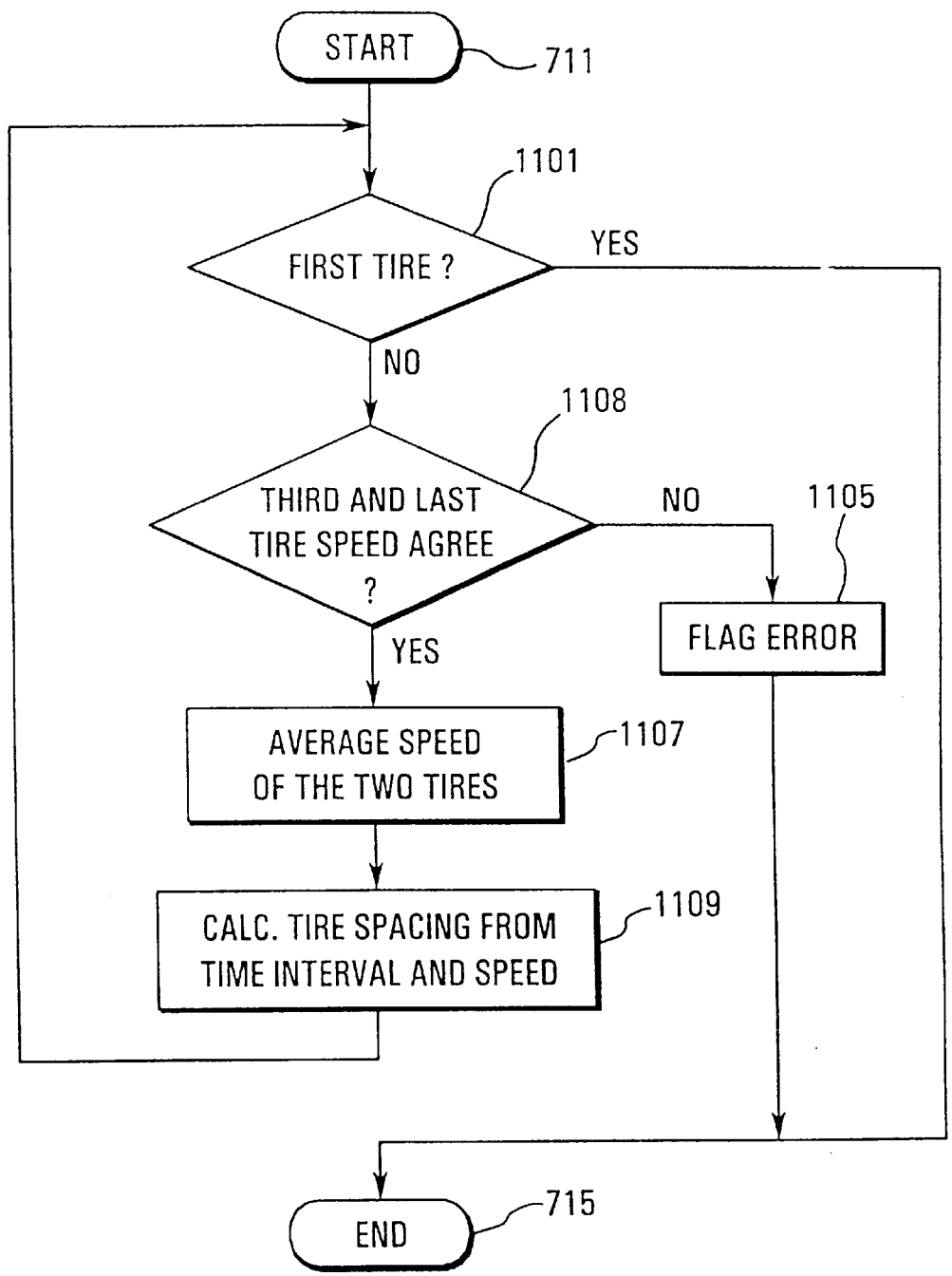
FIG. 11 is a flow diagram for calculating vehicle wheel spacing in the flow diagram of FIG. 7.

Turning to FIG. 11, a test 1101 is performed to determine if the first tire has crossed the contact switches S1 . . . S4. A "yes" condition ends the process which transfers to step 715 (See FIG. 7) for calculating tire length. A "no" condition initiates a test 1103 which determines whether the present tire and the last tire speed are in agreement. A "no" condition initiates an error condition 1105 after which the process ends and transfers to step 715. A "yes" condition initiates an operation 1107 which calculates the average speed of the two tires crossing the contact switches. An operation 1109 calculates the tire spacing using the time interval and speed, after which the process returns to step 1101 for a repeat of the process until the first tire crossing is detected, after which the process transfers to step 715 in which the tire length is calculated which will be described in conjunction with FIG. 12

Figure 12:
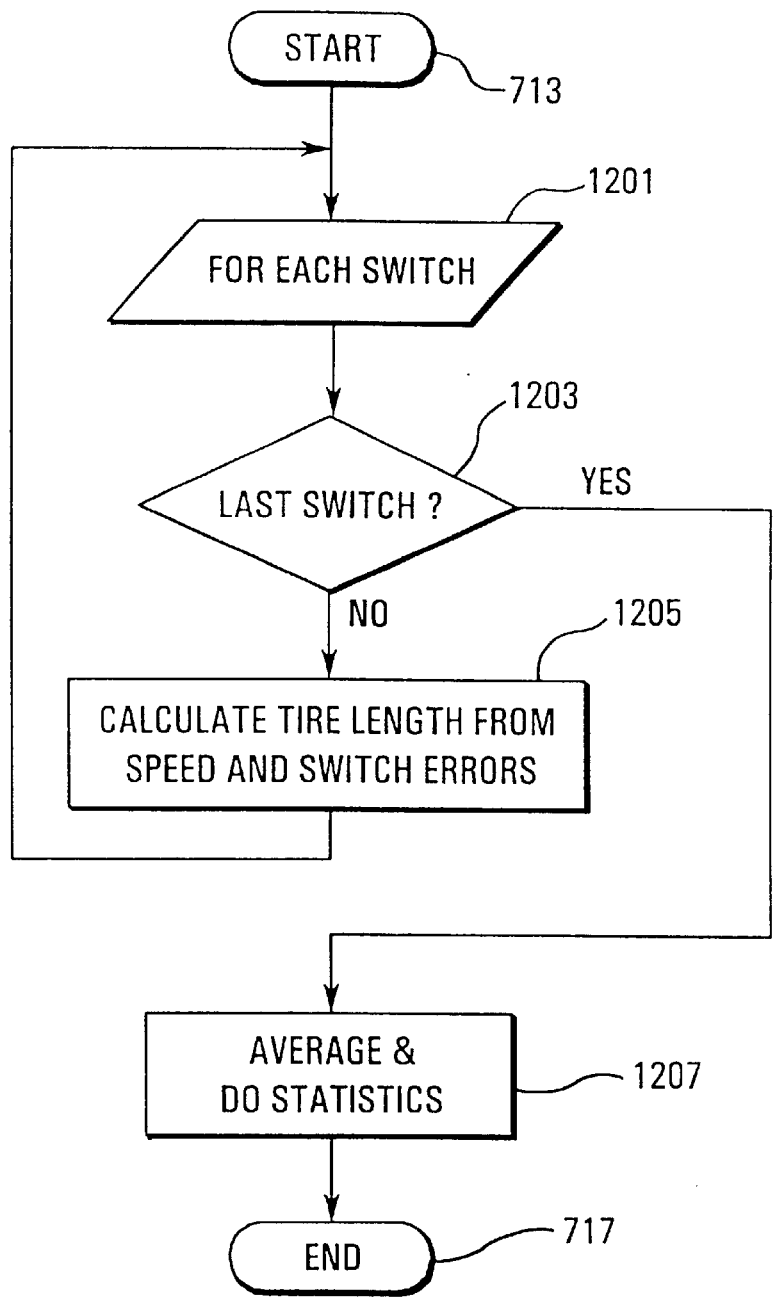
FIG. 12 is a flow diagram for calculating the tire length of the moving vehicle in the flow diagram of FIG. 7.

Turning to FIG. 12, a step 1201 is performed to check the operation of each contact switch S1 . . . S4, after which a test 1203 is performed to detect if the last switch operation has been detected. A "no" condition initiates an operation 1205 which calculates the tire length from the vehicle speed and the switch times recorded for switches S1 . . . S4 related to the tires, after which the process returns to step 1201 and continues until the last switch actuation has been detected. A "yes" condition for step 1203 initiates an operation 1207 which averages the tire lengths calculated by the switches and assembles the statistics the tire lengths, after which the process transfers to step 717 for calculating the wheel weights which will be described in conjunction with FIG. 13

Figure 13:
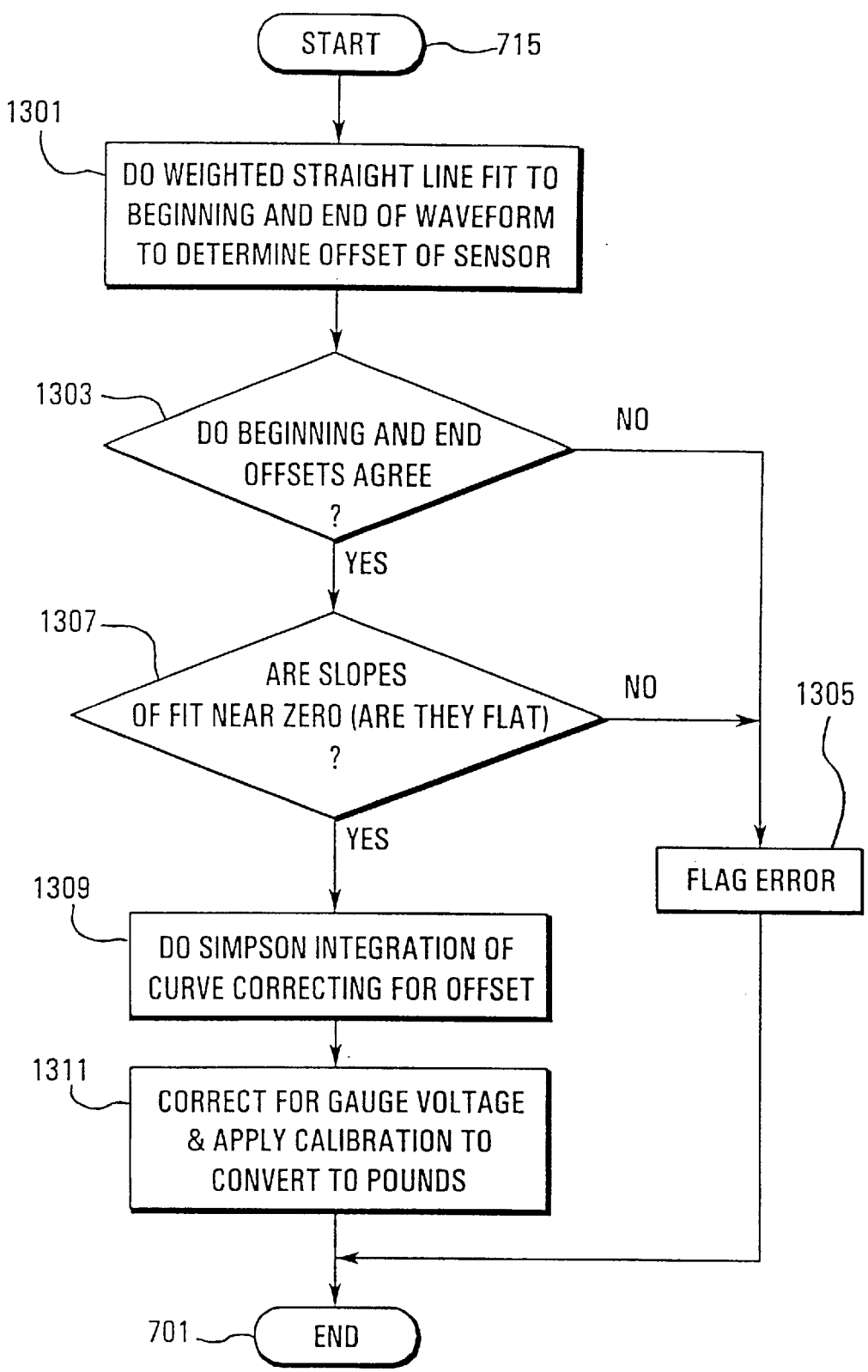
FIG. 13 is a flow diagram for calculating wheel weight in the flow diagram of FIG. 7.

Turning to FIG. 13, in an operation 1301 a waveform generated as a tire rolls over the sensor is fitted to a straight line at the beginning and end to determine any offset in the sensor. A test 1303 is performed to determine if the beginning and end offsets for the sensor agree. A "no" condition initiates an error flag 1305 after which the process transfers to the step 701 which initiates the data processing operation. A "yes" condition initiates a test 1307 to determine whether the slopes of the waveforms are near zero or flat. A "no" condition initiates the error state 1305. A "yes" condition initiates a step 1309 to perform a Simpson integration of the curve correcting for offsets, after which the process transfers to a step 1311 in which the waveform is corrected for gauge voltage and a calibration is applied to convert the waveforms to pounds. The process transfers to step 701 after calculation of the wheel weight for re-execution of the data processing operation.

Figure 14:
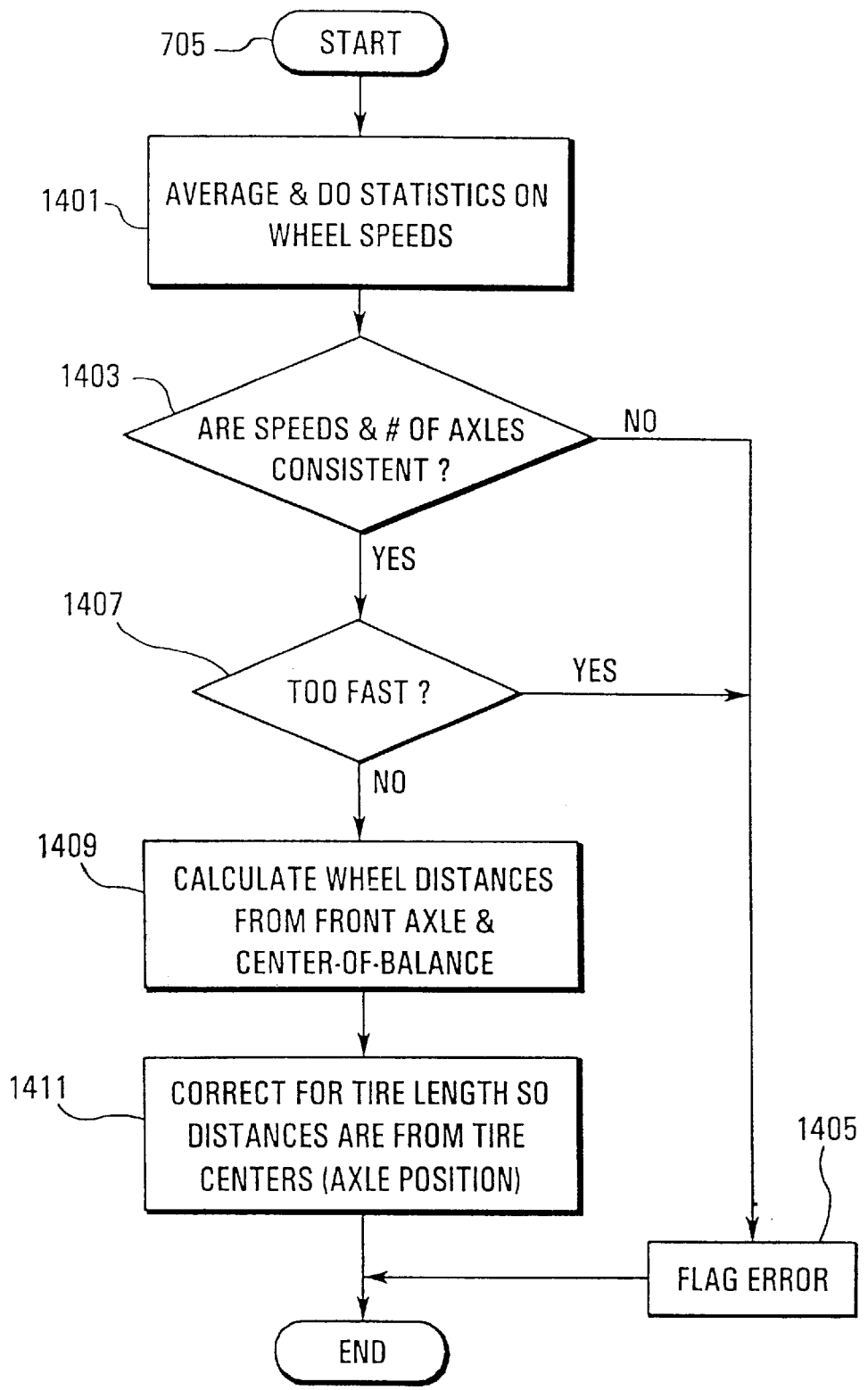
FIG. 14 is a flow diagram for calculating overall vehicle data in the flow diagram of FIG. 7.

After all of the vehicle data has been calculated, as described in FIGS. 8–13, the process transfers to step 705 which is described in FIG. 14. Turning to FIG. 14, an operation 1401 calculates the average wheel speeds and assembles the statistics for the vehicle. Afterwards a test 1403 is performed to determine if the wheel speeds and the number of axles are consistent. A "no" condition transfers the process to an error state 1405. A "yes" condition initiates a test 1407 to determine if the vehicle speed is too fast. A "yes" condition initiates an error state 1405. A "no" condition initiates an operation 1409 which calculates the wheel distances from the front axle and a center of balance is determined using conventional formula. The vehicle data calculation concludes with an operation 1411 which corrects the tire length such that the distances are from the tire centers or axle position.

Summarizing, the present invention determines the weight of a moving vehicle by calculating the tire loading as a distribution T(x) where x is in the direction of travel. As a tire rolls over a load sensor, a response W(x) is provided and a resultant waveform generated by the sensor is the convolution T(x)*W(x). The total weight of each tire is obtained by integrating the sensor output over time using a Simpson integration as the tire rolls over the sensor and multiplying the integration total by the tire speed to convert the result into weight. A sensitivity coefficient of each weight transducer is then adjusted to include the transducer sensitivity and its integrated profile. The resulting integration technique is independent of the tire footprint. With integration the tire can be much smaller, the same size or much bigger than the active sensor area. If a tread pattern has large gaps, the sensor must be large enough to provide a reasonable average over the grid pattern to minimize errors. Vehicle speed is determined from the switching interval and switch spacing using conventional formula.

While the invention has been described in a preferred embodiment, various modifications may be made therein without departing from the spirit and scope of the present invention as defined in the appended claims, in which:

We claim:

1. A system for weighing moving vehicles, comprising:
   a weight transducer positioned in the path of a moving vehicle providing a load signal indicative of the vehicle loading as the vehicle travels across the transducer;
   a vehicle speed sensor providing second a output signal indicative of the vehicle speed as the vehicle travels across the transducer; and
   a processor operable for calculating the weight of the moving vehicle by integrating substantially all of the first output signal over time as the vehicle travels over the transducer and multiplying the integration result by the vehicle speed and a calibration constant.

2. The system of claim 1 wherein the processor includes a data acquisition processor and a control processor and the load signal comprises Tx*Wx where Tx is the vehicle tire loading on the transducer in the direction of travel, Wx is the weight transducer response in the direction of travel, and * is a symbol for a convolution integration.

3. The system of claim 2 further comprising means for coupling together the data acquisition processor and the control processor and wherein the a convolution integration is a linear transform of an integral of Tx multiplied by an integral of Wx.

4. The system of claim 1 wherein the vehicle speed sensor comprises duplicate paired switches providing multiple sets of signals for redundancy in determining vehicle speed independent of tire configuration.

5. The system of claim 4 further including weight monitoring and switch monitoring circuits coupled to the data acquisition processor.

6. The system of claim 5 further including a sample clock circuit and counters coupled to the data acquisition processor.

7. The system of claim 6 further including an axle timer, a transducer timer, and a watchdog timer coupled to the data acquisition processor.

8. The system of claim 7 further including a first memory coupled to the data acquisition processor and a second memory coupled to the control processor.

9. The system of claim 8 further including stored program instructions in the first memory for starting the timers, time stamping and storing switching events as the vehicle traverses the switching means.

10. The system of claim 9 further including stored program instructions for starting the timers, time stamping weight values generated by the transducers, and storing the weight values as the vehicle traverses the transducer.

11. A method for weighing a moving vehicle, comprising the steps of:
obtaining a first output signal indicative of the vehicle loading as the vehicle travels across a transducer;
obtaining a second output signal indicative of the vehicle speed as the vehicle travels across the transducer; and
calculating the weight of the vehicle by integrating substantially all of the first output signal over time as the vehicle travels over the transducer and multiplying the integration result by the vehicle speed and a calibration constant.

12. The method of claim 11 further comprising the step of storing the first and second output signals as data in a memory, wherein the first output signals comprise Tx*Wx where Tx is the vehicle tire loading on the weight transducer in the direction of travel, Wx is the weight transducer response in the direction of travel, and * is a symbol for a convolution integration.

13. The method of claim 12 further comprising the step of sorting the data to determine the end of a tire traversing the transducer, wherein the convolution integration is a linear transform of the integral of Tx multiplied by the integral of Wx over the entire weight transducer.

14. The method of claim 13, wherein the vehicle speed sensor comprises a first pair of switches located before the transducer in the direction of vehicle travel and a second pair of switch located after the transducer in the direction of vehicle travel, further comprising the step of calculating the vehicle speed from the actuation of the first and second pairs of switches as the vehicle traverses the switches.

15. The method of claim 14 further comprising the step of calculating the vehicle wheel spacing as the vehicle traverses the switches.

16. The method of claim 15 further comprising the step of calculating the vehicle tire lengths as the vehicle traverses the switches.

17. The method of claim 15 further comprising the step of displaying the weight on a display device.

18. A method for weighing moving vehicles comprising the steps of:
receiving output signals indicative of vehicle loading and speed as the vehicle travels across a transducer; and
calculating weight of the vehicle by integrating substantially all of the vehicle loading signal over time as the vehicle travels over the transducer and multiplying the integration result by the vehicle speed and a calibration constant.

19. A computer usable medium having computer readable instruction for performing to method of claim 18.

20. A vehicle weighing-in-motion system operable for performing to method of claim 18.

21. A system for weighing and characterizing moving vehicles comprising:
a weight transducer having an entrance and an exit and positioned in the path of a moving vehicle, the transducer providing first output signals indicative of the vehicle loading as the vehicle travels across the transducer;
duplicate paired switches positioned before the entrance and after the exit of the transducer providing multiple sets of second output signals indicative of the vehicle speed, number and spacing of vehicle axles as the vehicles travels past the switches;
a data acquisition unit coupled to the weight transducer and the switches for collecting and storing the first and second output signals, the data acquisition unit including a sample clock circuit and counters, an axle timer, a transducer timer, a watchdog timer, a FIFO buffer and stored program instructions in a first memory for starting the timers, time stamping, and storing switching events as the vehicle travels past the switches; and
a processor operable for calculating the weight of the moving vehicle by integrating substantially all of the first output signal over time as the vehicle travels over the transducer and multiplying the integration result by the vehicle speed and a calibration constant.

* * * * *